United States Patent [19]

Baker et al.

[11] Patent Number: 5,688,884

[45] Date of Patent: Nov. 18, 1997

[54] POLYMERIZATION PROCESS

[75] Inventors: Bruce Edward Baker, Wilmington, Del.; Roger John Zipfel, Washington, W. Va.

[73] Assignee: E. I. Du Pont de Nemours and Company, Wilmington, Del.

[21] Appl. No.: 700,258

[22] Filed: Aug. 20, 1996

Related U.S. Application Data

[60] Provisional application No. 60/003,097 Aug. 31, 1995.

[51] Int. Cl.$^6$ .................................................. C08F 2/00
[52] U.S. Cl. ............................................ 526/225; 526/255
[58] Field of Search ........................................... 526/225

[56] References Cited

U.S. PATENT DOCUMENTS

| 4,380,618 | 4/1983 | Khan et al. | 526/206 |
| 4,381,384 | 4/1983 | Khan | 526/206 |
| 4,384,092 | 5/1983 | Blaise et al. | 526/225 |

*Primary Examiner*—Joseph L. Schofer
*Assistant Examiner*—N. Sarofin

[57] ABSTRACT

Compound of the formula $C_6F_{12}$—$CH_2CH_2$—$SO_3M$ wherein M is a cation having a valence of 1 is used as a dispersing agent in the aqueous dispersion polymerization of tetrafluoroethylene.

6 Claims, No Drawings

POLYMERIZATION PROCESS

RELATED APPLICATION

This Application claims benefits of Provisional application Ser. No. 60/003,097, filed Aug. 31, 1995.

FIELD OF THE INVENTION

This invention relates to the aqueous dispersion polymerization of tetrafluoroethylene.

BACKGROUND OF THE INVENTION

Perfluoroalkyl ethane sulfonic acid and salts thereof, having the formula $F(CF_2-CF_2)_nCH_2-CH_2-SO_3M$, wherein n is a cardinal number of 2 to 8 and M is a cation having a valence of 1, i.e. H, K, has been used as dispersing agent in the aqueous dispersion polymerization of tetrafluoroethylene (TFE) by itself or in combination with other copolymerizable fluorinated ethylenically unsaturated comonomers, as disclosed in U.S. Pat. No. 4,380,618. As disclosed in Example 2 of the patent, the dispersing agent is a mixture wherein the perfluoroalkyl group contains from 4 to 16 carbon atoms, averaging 8 carbon atoms. This surfactant is commercially available as Zonyl® TBS fluorochemical surfactant, and sometimes 8,2-TBS, the number 8 representing the average number of carbon atoms in the mixture of perfluoroalkyl groups and the number 2 representing the ethane carbon atoms. Atochem makes available FORAFAC 1033 and 1176, which are understood to be the sulfonic acid and potassium salt, respectively, of 6,2-TBS, the number 6 representing perfluorohexyl (n=3 in the above formula) as an emulsifier for the polymerization of fluorinated monomers. U.S. Pat. No. 4,025,709 discloses the use of perfluoroalkyl ethane sulfonic acid and salts as emulsifier for the aqueous dispersion polymerization of the fluorinated monomer vinylidene fluoride. The perfluoroalkyl group of the emulsifier is disclosed to contains from 4 to 8 carbon atoms. Hexafluoropropylene may be copolymerized with the $VF_2$ to obtain 3 wt % HFP in the resultant copolymer (Examples 6 and 7). The advantage of these emulsifiers over perfluorooctanoate as the emulsifier is disclosed to be greater thermal stability of the $VF_2$ polymer as indicated by less color formation in the polymer when subjected to various thermal treatments. The patent shows reduced color formation when both $C_8F_{17}$- and $C_6F_{13}$-ethanesulfonic acid salts are used as the emulsifier and less improvement when the $NH_4$ salt is used.

The industry standard for the aqueous dispersion polymerization of perfluorocarbon monomers has been the use of perfluoroalkanoate dispersing agents, and in particular wherein the alkyl group averages 8 carbon atoms, which is the perfluorooctanoate tested as the comparison emulsifier in the '709 patent. This dispersing agent, sometimes called perfluorocaprylate and sometimes called C-8, is disclosed in countless publications describing the polymerization of TFE by itself or with other monomers. If any appreciable amount of C-8 is left in the polymer, it does cause discoloration of the perfluorocarbon polymer at the high temperatures of its melt fabrication and use, but this problem has been overcome by effective removal of the C-8 from the polymer prior to melt fabrication or sintering.

Is It has been discovered however, that C-8 bioaccumulates in animals, thus raising a health question, and making it desirable to replace this industry standard. In particular, it has been found that in a 14-day feeding study involving rodents and standard protocol and 300 ppm of C-8 in the rodents' diet, the amount of fluorine remaining in the rodents' blood seven days after the C-8 diet was stopped was 220 ppm, as compared to 0.56 ppm in rodents which received no C-8 in the diet. It has also been discovered that Zonyl TBS (8,2-TBS) has the problem of bioaccumulation which is indicated by increasing liver weight for rodents being fed a diet which contains this material. In particular, only 3 ppm of the 8,2-TBS in the rodents' diet for 14 days causes a 50% increase in liver weight. C-8 has a similar problem; 4.4 ppm of C-8 in the diet causes a 50% increase in liver weight.

An effective dispersing agent is needed for the polymerization of perfluorocarbon monomer which does not bioaccumulate.

SUMMARY OF THE INVENTION

The present invention satisfies this need by virtue of the surprising discovery that 6,2-TBS, $C_6F_{13}-CH_2CH_2-SO_3M$, wherein M is a cation having a valence of 1, does not bioaccumulate as indicated by (a) 6,2-TBS being present in the rodents' blood at the level of only 0.45 ppm seven days after 300 ppm of 6,2-TBS was removed from the diet and (b) 6,2-TBS requiring 142 ppm in rodents' diet before an increase in liver weight of 50% occurs. In contrast to C-8 and 8,2-TBS (mixture of perfluoroalkyl groups containing 4 to 16 carbon atoms, averaging 8 carbon atoms), when only 3–4 ppm of 6,2-TBS is present in the diet, virtually no increase in liver weight occurs.

The present invention may be defined in the context of the process of polymerizing tetrafluoroethylene (TFE) in an aqueous medium containing initiator and dispersing agent to obtain a dispersion of polytetrafluoroethylene (PTFE) particles, the improvement comprising carrying out the polymerizing wherein the dispersing agent is $C_6F_{13}-CH_2CH_2-SO_3M$, wherein M is a cation having a valence of 1. For simplicity, this dispersing agent can be referred to as 6,2-TBS.

While the present invention is defined in terms of using the 6,2-TBS as the dispersing agent for making PTFE, the unexpected safety of this particular "cut" of the 8,2-TBS mixture as compared to the 8,2-TBS mixture is part of the invention as a whole.

It is also unexpected that 6,2-TBS is operable as a dispersing agent to make PTFE. By "operable" is meant that the PTFE can be made to have high molecular weight, as indicated by a melt viscosity of at least $1\times10^9$ Pa.s, desired particle size, and at acceptable polymerization rate and in addition, that the dispersing agent does not consume initiator. Other replacement candidates for C-8 have failed because of failing to provide one or more of these operability needs. One that had a chance for success, 8,2-TBS, failed because of the bioaccumulation problem as described above. Thus, from past experience, it was surprising to find a dispersing agent which not only satisfied operability but also safety.

With respect 6,2-TBS satisfying the high molecular weight operability need of PTFE, this too is unexpected in several respects. While C-8 acts as a dispersing agent for the making of PTFE, C-6 does not. C-6 has a six-carbon atom perfluoroalkyl group in contrast to the eight-carbon atom perfluoroalkyl group of C-8. 6,2-TBS also has a six-carbon atm perfluoroalkyl group. 6,2-TBS also has hydrogen atoms from the $CH_2CH_2$ group in greater concentration than 8,2-TBS. Hydrogen is a known chain transfer agent in the polymerization of TFE to make PTFE, which would reduce the molecular weight of the PTFE to less than desired level. Despite this greater concentration of hydrogen atoms, high molecular weight PTFE having a melt viscosity of at least $1\times10^9$ Pa.s can still be made when 6,2-TBS is used as the dispersing agent.

DETAILED DESCRIPTION OF THE INVENTION

The aqueous dispersion polymerization process of the present invention is conventional except for the use of 6,2-TBS as the dispersing agent for making PTFE. The initiator is water-soluble; examples include ammonium persulfate, potassium persulfate, and disuccinic acid peroxide and will generally be used in the amount of 2–500 ppm based on the weight of water present. Wax may be present to reduce coagulaum formation, in an amount of 0.1–12% based on the weight of water present.

6,2-TBS can be prepared from the known process starting with reaction of $R_fI$ with $CH_2=CH_2$ to produce the mixture of compounds available as Zonyl TBS (8,2-TBS). In the reaction to make 8,2-TBS, $R_f$ is a mixture of C4 to C16 perfluoroalkyl, averaging 8 carbon atoms. To obtain 6,2-TBS, the reactant $R_fI$ is purified to obtain perfluorohexyl iodide, preferably wherein at least 90% of the perfluoroalkyl groups are perfluorohexyl, which purity is carried over into the eventual 6.2-TBS product. This purification can be carried out by distillation, and separation of the 6-carbon atom fraction from the other fractions present, the 4-carbon atom fraction having a boiling point of 67° C., the 6-carbon atom fraction boiling at 118° C., and the 8-carbon atom fraction boiling at 163° C., all at atmospheric pressure. Further information on the synthesis of Perfluoroalkyl iodide and distillation and reaction of the iodide to form 6,2-iodide is disclosed in N. S. Rao and R. E. Baker, "Textile Finishes and Fluorosurfactants", *OrganoFluorine Chemistry: Principles and Commercial Applications*, Ed. R. E. Banks et. al., Plenum Press, New York, 1994. The 6,2-TBS can be obtained from perfluorohexyl ethane iodide (6,2-iodide) by well-known chemistry, such as disclosed in U.S. Pat. No. 4,784,809.

The amount of 6,2-TBS used as dispersing agent will generally be 0.01–0.4 percent based on the weight of water present. Perfluorohexyl ethane sulfonic acid is preferred over the salt because of the greater solubility of the acid. Alkali metal sulfonates, however, such as sodium and potassium, can be used. Ammonium sulfonate can also be used.

The polymerization can be carried out by charging the polymerization reactor with water, surfactant and monomer, agitating the contents of the reactor, and heating the reactor to the desired polymerization temperature, e.g. 50–110 degrees C., and then adding initiator at the desired rate to start and continue the polymerization. Tetrafluoroethylene (TFE) is pressured into the reactor at a continuos rate to maintain a pressure of 0.3 to 7 MPa. TFE may be the only monomer used, in which case the PTFE formed will be homopolymer. Alternatively, an amount of copolymerizable perfluorinated comonomer other than TFE can be added to the reactor to copolymerize with the TFE wherein the resultant PTFE is modified with less than 0.5 mol % of the comonomer to impart at least improved film forming properties upon sintering, while still retaining the PTFE character of the polymer. The PTFE will generally be non-melt-fabricable, i.e. it will have a melt viscosity exceeding $1\times10^9$ Pa.s at 380° C. Melt viscosity in this range is measured at 380° C. by the tensile creep method in U.S. Pat. No. 3,819,594. Chain transfer agent, such as ethane or methanol, can be present during the polymerization reaction to provide lower melt viscosity PTFE, e.g. 10 Pa.s to $1\times10^5$ Pa.s measured at 372° C. Comonomer, if present will preferably be a perhaloolefin such as chlorotrifluoroethylene or perfluoroolefin such as hexafluoropropylene, or perfluoro(alkyl vinyl ether), wherein the alkyl group contains 1 to 8 carbon atoms, preferably 2 or 3 carbon atoms. The polymerization is carried out to achieve the desired polymer solids concentration in the aqueous dispersion, e.g. 20 to 60% based on the weight of water plus solids present, and the polymerization is stopped by stopping the TFE feed and venting the reactor to remove unreacted monomer.

The preferred raw dispersion particle size (RDPS) of the PTFE is 0.15 to 0.35 micrometers. Smaller particles are difficult to coagulate and cause excessively high extrusion pressures in past extrusion. Larger particles interfere with polymerization by premature coagulation and lead to incomplete sintering. The amount of 6,2-TBS dispersing agent used is effective to achieve the dispersion of polymer particles and preferably the preferred particle size within the range recited above.

Instead of the entire amount of the dispersing agent being added to the reactor at the beginning of the polymerization, a portion of the dispersing agent can be added during the polymerization reaction.

RDPS is measured on the as-polymerized polymer particles by photon correlation spectroscopy.

EXAMPLE 1

A horizontally disposed, cylindrical, stainless steel autoclave, having a capacity of 36,250 ml and a length to diameter ration of about 1.5:1 and provided with a 4-bladed agitator running the length of the autoclave, was charged with 18 kg of demineralized water, 0.09 g of ferrous chloride, and 930 g of paraffin wax. At a temperature of 65° C., the autoclave was evacuated and purged with TFE three times. After the third evacuation, while the autoclave was still under vacuum, 34 g perfluorohexyl ethane sulfonic acid dispersing agent, 0.65 g methanol, and 0.08 g octylphenolethoxylate dissolved in 900 ml of demineralized water was charged. With the agitator at 46 rpm, the autoclave was brought to 90° C., pressured with tetrafluoroethylene monomer to 27 $kg/cm^2$ (380 psig) and 13 g of disuccinic peroxide (DSP), and 0.1 g of ammonium persulfate (APS) initiators dissolved in 1000 ml of demineralized water were added at a rate of 100 ml/min. After kick-off, the pressure was maintained at 27 $kg/cm^2$ by continuous TFE addition until the end of the batch. After 1.4 kg of TFE had reacted after kickoff, 27.2 g of perfluorohexyl ethane sulfonic acid dispersion agent dissolved in 1000 ml of demineralized water were added at a rate of 50 ml/min. The agitator rpm was adjusted to keep the rate of polymerization below 0.6 lb/min until the end of the batch. When a total of 15 kg of TFE monomer had been added to the autoclave, the feed valve was closed, the agitator was turned off and the autoclave was vented. The total polymerization time was 85 minutes.

The resulting dispersion was discharged from the autoclave, cooled, and the wax was removed to yield a dispersion of 46.5% solids with an average particle size of 0.174 micrometers. The resin had an SSG of 2.227, indicating a melt viscosity of greater than $1\times10^9$ Pa.s at 380° C. SSG (standard specific gravity) was measured by the method of ASTM D-4895.

EXAMPLE 2

A similar reactor to that used in Example 1 but having a water capacity of 87.1 parts was charged with 50.9 parts by weight of demineralized water and 0.022 parts of perfluorohexyl ethane sulfonic acid dispersing agent. The reactor was pressure tested at 400 psig (28.4 kg/cm$^2$) and 90° C. while stirring the reactor at 46 rpm. The reactor was cooled to reduce its temperature below 30° C. and was then evacuated and purged three times with TFE monomer. A reduced pressure was left on the reactor after the final evacuation. A valve was then opened to slowly release ethane chain transfer agent into the reactor until the pressure was raised by 11.3 psi (0.80 kg/cm$^2$). The valve was then closed and the reactor was pressurized with TFE to a pressure of 380 psig (27 kg/cm$^2$). A freshly prepared solution (1.4 parts) of 0.092 wt. % APS and 1.15 wt. % DSP in demineralized water was pumped into the reactor at a rate of 0.11 parts/minute to initiate polymerization. After polymerization began (10 psig drop in reactor pressure), additional TFE was added to the reactor so as to maintain the reactor pressure at 380 psig (27 kg/cm$^2$). After three parts TFE addition, 2.0 parts of a solution of 2.78% perfluorohexyl ethane sulfonic acid in demineralized water was pumped into the reactor at a rate of 0.20 parts/minute. After the addition of 15 parts of TFE, 0.48 parts of the same APS/DSP initiator solution used above was pumped into the reactor at 0.09 parts/minute. When 22 parts of TFE had been added to the reactor after kickoff (after 193 minutes), the TFE feed was stopped but the reaction was continued until the reactor pressure dropped to 185 psig (13.1 kg/cm$^2$) after an additional 42 minutes reaction time. The reactor dispersion contained about 32% polymer by weight. The dispersion particle size was 0.156 microns. A portion of the dispersion was cooled, diluted to 16.9 wt. % with demineralized water, and 1.3 wt. % ammonium carbonate (based on polymer) was added. This mixture was coagulated by vigorous stirring to afford a powder which was collected on a filter and then dried at 150° C. for two days. The melt viscosity of the powder was found to be 3.0×10$^4$ poise at 372° C. (3.0×10$^3$ Pa.s). Melt viscosity was determined by ASTM method D1238-52T modified as described in U.S. Pat. No. 4,380,618 except that the melt viscosity in poise was calculated as 36,910 divided by the observed extrusion rate expressed in grams per minute.

What is claimed is:

1. In the process of polymerizing tetrafluoroethylene in an aqueous medium containing initiator and dispersing agent to obtain an aqueous dispersion of polytetrafluoroethylene particles, the improvement comprising carrying out the polymerization wherein said dispersing agent is a compound of the formula $C_6F_{13}$—$CH_2CH_2$—$SO_3M$, wherein M is a cation having a valence of 1.

2. In the process of claim 1 wherein perfluorinated copolymerizable comonomer is present in said aqueous medium, whereupon said polytetrafluoroethylene contains said comonomer in an amount less than 0.5 mol %.

3. In the process of claim 1 wherein said comonomer is perfluoroolefin or perfluoro(alkyl vinyl ether).

4. In the process of claim 1 wherein M is hydrogen.

5. In the process of claim 1 wherein said polytetrafluoroethylene made using said compound has a melt viscosity of at least 1×10$^9$ Pa.s.

6. In the process of claim 1 wherein said polytetrafluoroethylene made using said compound has a raw dispersion particle size of 0.15 to 0.35 micrometers.

* * * * *